United States Patent [19]

DeJager

[11] Patent Number: 5,550,910
[45] Date of Patent: Aug. 27, 1996

[54] END-USER COMMUNICATIONS DEVICE WITH AUTOMATIC CARRIER SELECTION CAPABILITY FOR INTRALATA TOLL CALLS

[75] Inventor: Dale S. DeJager, Lincroft, N.J.

[73] Assignee: Lucent Technologies Inc., Murray Hill, N.J.

[21] Appl. No.: 342,062

[22] Filed: Nov. 18, 1994

[51] Int. Cl.$^6$ ................................................ H04M 11/06
[52] U.S. Cl. ..................... 379/220; 379/201; 379/89; 379/112; 379/115
[58] Field of Search ........................ 379/201, 112, 379/114, 88, 89, 67, 223, 127, 93, 101, 220, 269, 115

[56] References Cited

U.S. PATENT DOCUMENTS

| | | | |
|---|---|---|---|
| 4,521,857 | 6/1985 | Reynolds, III | 379/101 |
| 4,935,956 | 6/1990 | Hellwarth et al. | 379/112 |
| 5,036,533 | 7/1991 | Carter et al. | 379/112 |
| 5,210,789 | 5/1993 | Jeffus et al. | 379/127 |
| 5,315,649 | 5/1994 | Foster et al. | 379/201 |
| 5,355,404 | 10/1994 | Leduc et al. | 379/201 |
| 5,381,465 | 1/1995 | Carter et al. | 379/89 |
| 5,414,773 | 5/1995 | Handelman | 379/101 |
| 5,430,793 | 7/1995 | Ueltzen et al. | 379/93 |
| 5,452,350 | 9/1995 | Reynolds et al. | 379/127 |

OTHER PUBLICATIONS

Automatic Carrier Selector—ACS 2000 Preliminary Specification, Telegen Proprietary Information, 1993.

Primary Examiner—Jeffery Hofsass
Assistant Examiner—Scott Wolinsky
Attorney, Agent, or Firm—John A. Caccuro; Henry T. Brendzel

[57] ABSTRACT

An end-user communicating device and method for enabling a user-selected communications carrier network to download data into a RAM within the end-user communicating device in response to a telephone call initiated by a user of the end-user communicating device to the carrier network to access a database within the carrier network. The data includes a carrier access code that is used to establish intraLATA toll calls and exchange numbers included in an intraLATA toll calling area associated with origination information obtained during the telephone call, such as the telephone number of the end-user communicating device. The end-user communicating device prepends the carrier access code to subsequently dialed telephone numbers that contain one of the exchange numbers included in the intraLATA toll calling area. If the data is corrupted, the telephone number of the carrier network is retrieved from a ROM within the end-user communicating device and dialed to refresh the memory of the end-user communicating device.

15 Claims, 4 Drawing Sheets

FIG. 2

| ORIGINATION INFORMATION | | EXCHANGE NUMBER IN TOLL-FREE INTRALATA CALLING AREA |
|---|---|---|
| AREA CODE | EXCHANGE NUMBER | |
| 908 | 291 | 219<br>222<br>229<br>264<br>291<br>530<br>571<br>576<br>615<br>671<br>706<br>741<br>747<br>758<br>842<br>888<br>957 |
| 609 | 339 | 229<br>339<br>429<br>467<br>478<br>540<br>678<br>769<br>935 |

END-USER COMMUNICATIONS DEVICE WITH AUTOMATIC CARRIER SELECTION CAPABILITY FOR INTRALATA TOLL CALLS

TECHNICAL FIELD

This invention relates to communication systems and more particularly to an end-user communicating device having automatic carrier selection capability for intraLATA toll calls.

BACKGROUND OF THE INVENTION

Recent deregulation in the communications industry has opened up to full-scale competition the IntraLATA long-distance telephone market. Taking advantage of the new regulatory environment, Interexchange Carriers (IXC), such as AT&T, have started offering and aggressively marketing to telephone subscribers intraLATA long distance communications services (hereinafter called "intraLATA toll calls").

Unfortunately, IXC efforts in the intraLATA toll calls market have been hampered by a number of roadblocks. For example, a telephone subscriber who wants to place an intraLATA toll call and who wishes to use the communications services offered by an IXC instead of the services of the local telephone company, must first dial a five-digit access code (assigned to the IXC) followed by the seven-digit (or ten-digit) telephone number of the called party. This cumbersome dialing arrangement is needed because users of local telephone service cannot pre-subscribe to a communications carrier of their choice for intraLATA toll calls the same way they can select a primary interface carrier for interLATA communications services. The inconvenience of dialing the carrier access code gives an unfair advantage to the Local Exchange Carrier (LEC) because no access code is needed for access to the LEC network. Hence, from a public policy perspective, the carrier access code dialing arrangement hinders, rather than promotes, full-scale competition in the intraLATA toll calls market.

In response to this problem, network-based and premises-based solutions have been proposed. For example, in an effort to level the playing field in the intraLATA communications services market, consideration has been given to implement an equal access solution for intraLATA toll calls, as is currently done for long distance communications services. However, implementation of equal access for intraLATA toll calls would require expensive hardware upgrade and/or software changes to the Local Exchange Carrier (LEC) central office switches.

From a premises standpoint, it has been suggested that users who have telephone sets with speed-dial feature program their telephone sets to include the five-digit access code of their preferred carrier in frequently dialed numbers for intraLATA toll calls. However, this solution is only limited to those frequently called numbers and is inoperative for telephone sets with speed-dial memory capable of storing less than twelve (12) digits. Hence, it is a continuing problem to provide telephone subscribers with a convenient way to select a carrier of their choice for intraLATA toll calls.

SUMMARY OF THE INVENTION

The present invention is directed to an end-user communicating device, such as a telephone set with a built-in processor capable of automatically prepending a carrier access code to any telephone number dialed for an intraLATA toll call.

In a preferred embodiment of the invention, a telephone set is arranged to initiate an initialization phone call to access a database operated and administered by a default or user-selected communications carrier. Origination information associated with the initialization call is used to retrieve from the database specific geographical data such as, a set of telephone numbers that are included in an intraLATA calling area that is toll-free for calls initiated from the point of origin of the initialization call. The retrieved information which may include the carrier access code is downloaded to a storage device in the telephone set. Subsequently, when a caller uses the telephone set to dial a telephone number in order to place an intraLATA call, a processor in the telephone determines from the dialed digits whether the call is an intraLATA toll call. If so, the processor prepends the carrier access code to the dialed digits. Thereafter, the call is completed over the user-selected communications carrier network in a conventional manner.

From a more general perspective, the invention permits a computer system to download particularized software to a communicating end-user device in response to a call initiated from that device to the computer system. By recognizing origination information associated with the call, the computer system is able to assess the need of the user and downloads the appropriate software to the end-user communicating device for the benefit of that user.

BRIEF DESCRIPTION OF THE DRAWING

In the drawings:

FIG. 2 depicts an illustrative representation of a table stored in a database of the communications switching system of FIG. 1;

DETAILED DESCRIPTION

Figure 1:
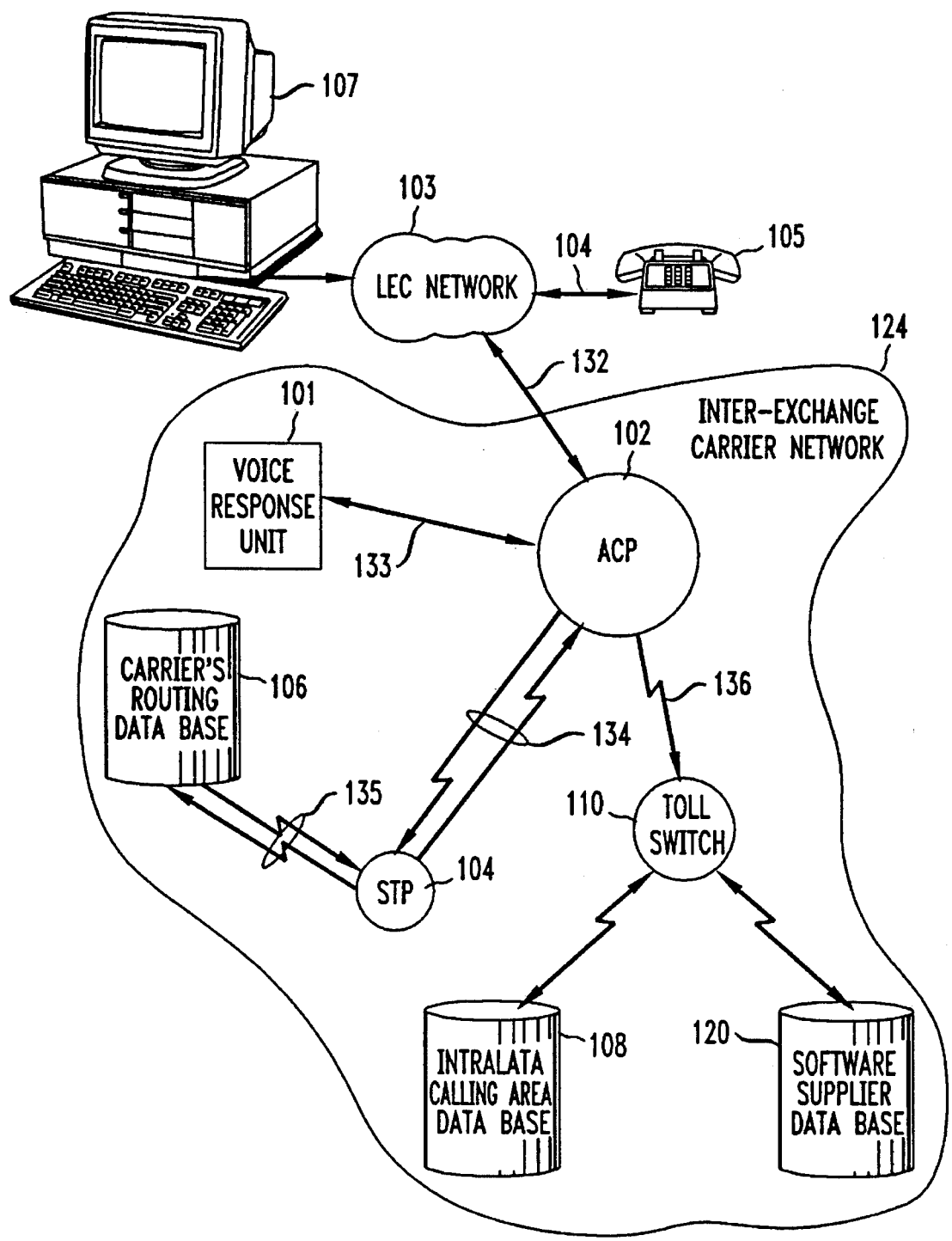
FIG. 1 shows, in block diagram form, a communications switching system arranged to download information to an end-user communicating device in response to a call initiated from the end-user communicating device.

Shown in FIG. 1 are two end-user communicating devices, namely, a telephone set 105 that is connected to LEC network 103 via line 104 and a Personal Computer (PC) 107 that is also linked to a LEC network 103 which, in turn, is connected to Interexchange Carrier Network 124 via trunk 132. In this example, interexchange carrier network 124 is associated with a communications carrier selected by the user(s) of telephone set 105 to carry all intraLATA toll call traffic originated from telephone set 105, as described in further detail below. As part of the initialization process of telephone set 105, a call, such as a toll-free call, for example, is initiated to access intraLATA calling area database 108. Similarly, a call that is destined for software supplier database 120 may be initiated by a user of PC 107. The dialed digits (called party number), as well as the calling party number also called "Automatic Number Identification"

(ANI) associated with telephone set 105 or PC 107, are forwarded to LEC network 103. Calling and called party numbers are hereinafter referred to as "call origination information". LEC network 103 promptly forwards the call origination information to Action Point (ACP) 102 upon recognizing that the call is destined for a called party associated with interexchange carrier network 124. ACP 102 is the point of entry for all traffic from LEC network 103 to be switched on interexchange carrier network 124. As such, when ACP 102 receives call origination information, it forwards that information to carrier routing database 106 via Signal Transfer Point (STP) 104 over facilities 134. STP 104 represents illustratively a Common Channel Signaling network which is a a packet switching system composed of a plurality of interconnected nodes called "Signal Transfer Points" (STP) that are used to exchange call handling messages between processor-driven switching systems according to a specific protocol. For the sake of simplicity, the signaling network is represented in FIG. 1 by STP 104.

Alternatively, ACP 102 may connect the caller to voice response unit 101 (via line 133) before forwarding the call origination information to carrier routing database 106. This alternative arrangement, which is applicable only for calls initiated from telephone sets, may be used, for example, when a merchant of telephone sets embodying the principles of the invention, places the initialization telephone call on behalf of a customer. Voice response unit 101 is arranged to play an announcement in order to solicit and collect information from a caller. In this example, voice response unit 101 may play an announcement to solicit the telephone number at which telephone set 105 is to be used. Once appropriate information has been collected from the caller, voice response unit 101 forwards the collected information to ACP 102 which substitutes the collected information to the called party number as needed, and transmits the new called party number, as appropriate, and the calling party number to carrier routing database 106 via STP 104 and facilities 134 and 135.

Upon receiving the calling and called party numbers, carrier routing database 106 retrieves pre-stored records associated with the called party number to formulate call routing instructions that are transmitted to ACP 102 via STP 104. Those routing instructions include the Plain Old Telephone Service (POTS) destination number for intraLATA calling area database 108. ACP 102 uses the POTS destination number to complete the call to intraLATA calling area database 108 by using the transmission facilities of link 136 and the switching capabilities of tollswitch 110.

IntraLATA calling area database 108 is a computer system with mass storage devices containing the table of FIG. 2. The third column of the table of FIG. 2 shows exchange numbers in a toll-free intraLATA calling area for an area code and an exchange number which are included in a calling party number. For example, when a calling party number includes an area code, such as area code 609 (listed in the first column) and an exchange number, such as exchange number 339 (listed in the second column), intraLATA calls destined for called parties at exchange numbers 229, 339, 429, 467,478, 540, 678, 769 and 935 are toll-free. Hence, when intraLATA calling area database 108 receives the calling party number associated with telephone set 105, it uses the area code and the exchange number (included in that calling party number) as a search key to retrieve the intraLATA toll-free exchange numbers for the calling party number. The retrieved exchange numbers are then downloaded to a storage device of telephone set 105. While the table of FIG. 2 shows exchange numbers for an intraLATA toll-free calling area, it is to be understood that the third column of the table of FIG. 2 can alternatively store exchange numbers for intraLATA toll area for calls originated from telephone set 105. From a more general perspective, the table of FIG. 2 can store other types of initialization data downloaded thereto by database 108 or 120.

For calls initiated from PC 107, routing database 106 translates the called party number (which may be, for example, an 800 or 900 number) to a POTS number that is used to complete the call to software supplier database 120. The latter is a repository of software comprised of programming instructions and data associated with particular calling party numbers or ANI. By way of example, software supplier database 120 may belong to an on-line information service provider, such as AT&T EasyLink Service, which may store, for example, communications software packages with scripts to log into their on-line information databases via modem pools. The communications software packages may include, for example, telephone numbers associated with the modem pools. Thus, when a call that is destined for an on-line information service provider, is initiated from PC 107 for the purpose of receiving programmed instructions on how to access the databases of the on-line information service provider's, database 120 downloads the requested communications software package along with the scripts and the telephone number(s) of nearby modem pools. Software in database 120 is designed to match the ANI associated with PC 107 to a list of telephone numbers of a nearby modem pool.

Figure 3:
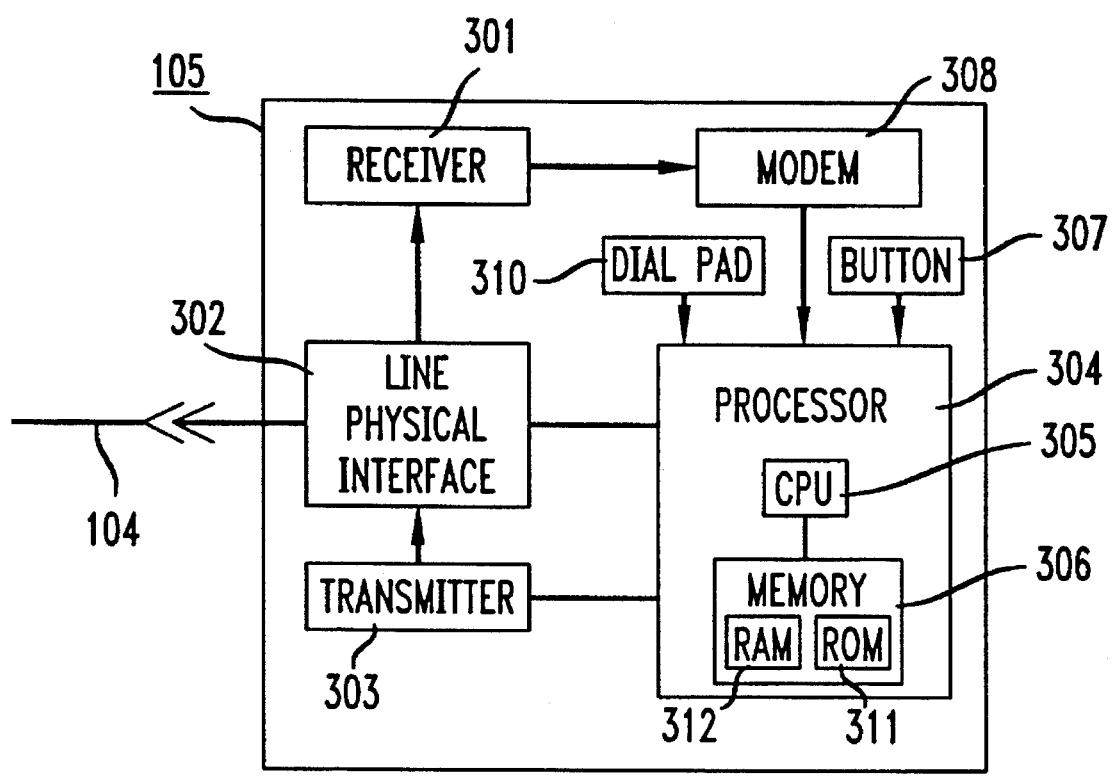
FIG. 3 shows the major components of an end-user communicating device designed in accordance with the invention.

FIG. 3 shows the major components of an end-user communicating device needed to implement the invention. The telephone set of FIG. 3 includes a receiver 301, a line physical interface 302, a transmitter 303, a button 307, a modem 308, and a processor 304 which is comprised of a memory 306 and CPU 305. Memory 306 includes Read-Only-Memory (ROM) 311 which is a non-volatile memory storing the telephone number of the user-selected carrier, and RAM 312 which is a volatile memory arranged to receive and store telephone numbers downloaded from intraLATA calling area database 108 of FIG. 1 (as described in further detail below. The telephone number of the user-selected carrier may be input into ROM 311 by a manufacturer using, for example firmware downloading techniques. Alternatively, ROM 311 may be an Erasable Programmable Read Only Memory (EPROM) which may be coupled to an electro-mechanical eleven-dip switch whose setting allows a user to select and store in ROM 311 the telephone number of a preferred carrier. Because ROM 311 is non-volatile memory, when power is removed from the end-user communicating device, ROM 311 retains its data.

Unlike ROM 311, RAM 312 is a volatile memory. As such, data stored therein, are subject to be corrupted when power outages or surges occur. Accordingly, programmed recovery instructions (firmware) for RAM 312 are stored in ROM 311 for bringing back RAM 312 to a steady state. In essence, the programmed instructions are designed to ascertain that data stored in RAM 312 has been corrupted and to re-initialize the end-user communicating device by dialing the telephone number of the user-selected communications carrier stored in ROM 311 in order to receive the exchange numbers for an intraLATA toll-free calling area. In particular, an off-hook signal is generated from the end-user communicating device of FIG. 3 and the pre-stored telephone number of intraLATA calling area database 108 of FIG. 1 is retrieved from Read-Only-Memory (ROM) 311 to be forwarded by Central Processing Unit (CPU) 305 to LEC network 103 of FIG. 1 via transmitter 303 and line physical interface 302. Alternatively, the initialization call can be initiated when a user depresses button 307.

Once a connection is established from the end-user communicating device of FIG. 3 to intraLATA calling area database 108 of FIG. 1, modem 308 is activated to convert analog signals received from interexchange carrier 124 (via receiver 301) to digital signals that are stored in memory RAM 312. Those analog signals include the carrier access code and the exchange numbers of the intraLATA toll-free calling area which are shown in the third column of FIG. 2. When the enduser communicating device, is an Integrated Digital Service Network (ISDN) station set connected to LEC network 103 via a Basic Rate Interface (BRI) line, modem 308 is not activated. When the analog signals received by telephone set 105 from intraLATA calling area database are Dual Tone Multifrequency (DTMF) signals, a tone detector may be used in conjunction with modem 308.

Figure 4:
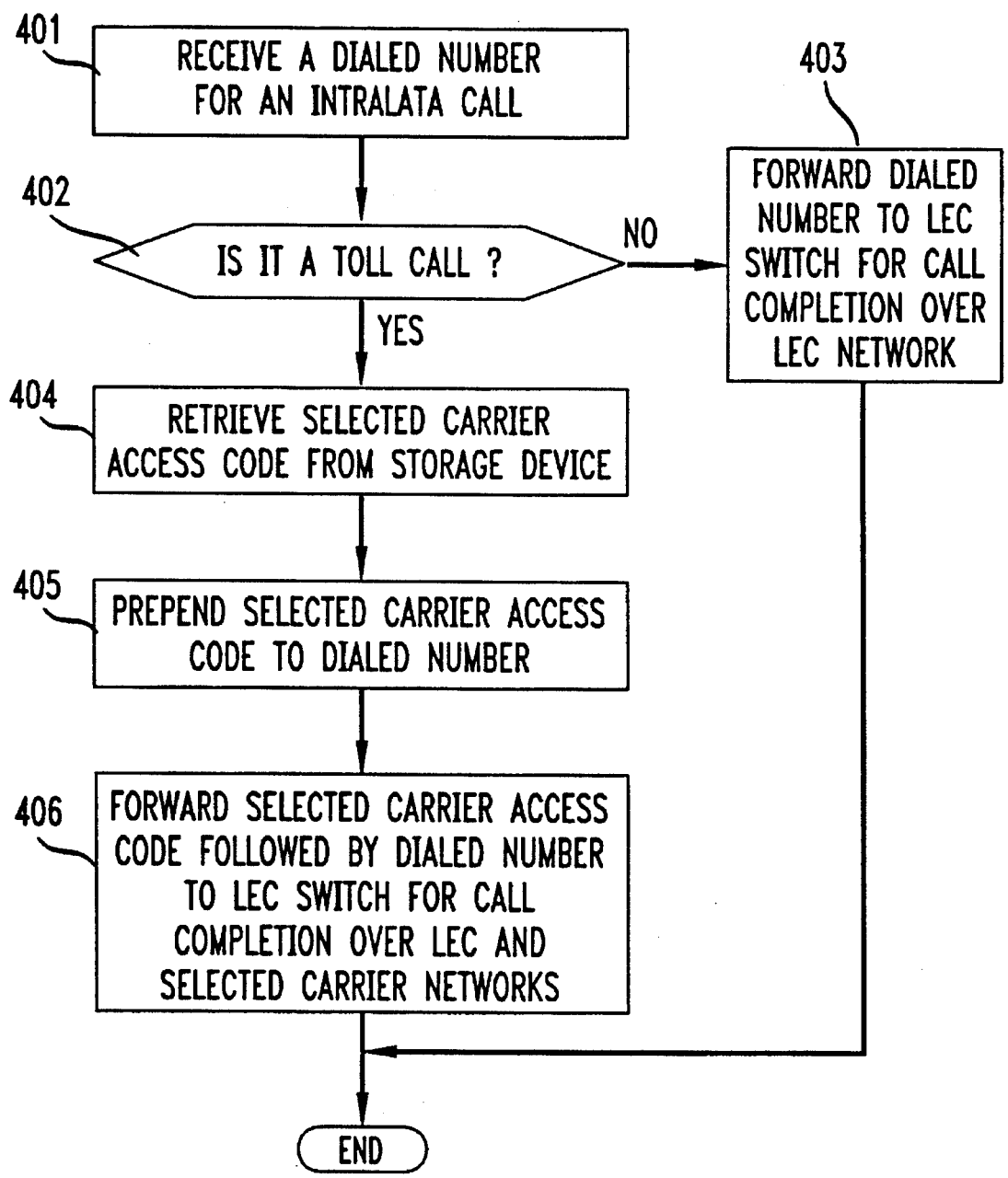
FIG. 4 presents, in flow diagram format, actions taken and decisions formulated by a processor of the end-user communicating device of FIG. 3 to establish an intraLATA toll call over the network of a user-selected communications carrier.

At the heart of the communications device of FIG. 3 is processor 304 which uses CPU 305 to execute programming instructions stored in memory 306 to determine whether an access code should be pre-pended to a telephone number entered by a caller on dialpad 310. The instructions executed by CPU 305 are shown in FIG. 4.

When CPU 305 receives a telephone number entered by a caller on dialpad 310 in step 401, CPU 305 ascertains whether the call is an intraLATA call or an interLATA call based, for example, on the presence of a particular area code (or lack thereof), and the number of digits entered by the caller. In this example, it is assumed that the call is an intraLATA call. CPU 305 then determines, in step 402, whether the call is an intraLATA toll call. This is accomplished by using the exchange number entered by the caller as a search key to match the digits in the caller-entered exchange number to an entry in the exchange numbers stored in RAM 312. When a match is found, the dialed numbers are forwarded, in step 403, to LEC network 103 for call completion over that network in a conventional manner. Because RAM 312 stores only exchange numbers for the toll-free intraLATA calling area, when a match is not found, CPU 305 "infers" that the call is an intraLATA toll call. Accordingly, in step 404, CPU 305 fetches the selected carrier access code from RAM 312. The carrier access code is then prepended to the dialed digits, in step 405, for transmission, in step 406, to LEC network 103 of FIG. 1 via transmitter 303 and line physical interface 302 of FIG. 3. The call is then routed in a conventional manner via the LEC network 103 and interexchange carrier network 124 of FIG. 1.

The foregoing is to be construed as only being an illustrative embodiment of this invention. Persons skilled in the art can easily conceive of alternative arrangements providing functionality similar to this embodiment without any deviation from the fundamental principles or the scope of this invention.

I claim:

1. An end-user communicating device comprising:

a dialing apparatus for initiating a first telephone call in order to access a database in a communications carrier network;

a memory for storing data retrieved from said database, said data including a) a carrier access code that is used to establish intraLATA toll calls, and b) exchange numbers included in an intraLATA toll calling area associated with origination information obtained during said first telephone call; and a processor for i) comparing each telephone number that is subsequently dialed via said dialing apparatus to said exchange numbers included in said intraLATA toll calling area, and ii) prepending said carrier access code to each subsequently dialed telephone number that comprises one of said exchange numbers included in said intraLATA toll calling area.

2. The end-user communicating device of claim 1, wherein said communications carrier network further comprises:

at least one communications switch which identifies an originating telephone number associated with said first telephone call; and transmission facilities via which said retrieved data is downloaded into said memory of said end-user communicating device.

3. The end-user communicating device of claim 1, wherein said communications carrier network comprises:

a voice response unit which prompts a caller placing said first telephone call to solicit a particular telephone number at which said end-user communicating device is to be used; and transmission facilities via which said retrieved data is downloaded into said memory of said end-user communicating device.

4. The end-user communicating device of claim 1, wherein whenever said stored data has been corrupted, the telephone number of said communications carrier network is retrieved from a storage area within said end,user communicating device and dialed to refresh said memory of said end-user communicating device.

5. The end-user communicating device of claim 1, wherein said first telephone call is a toll-free telephone call.

6. The end-user communicating device of claim 1, wherein said data is downloaded to said end-user communicating device in response to said first telephone call.

7. A system for downloading networking information from a database to an end-user communicating device used to initiate intraLATA telephone calls routed over a communications carrier network, said system comprising:

means responsive to a call initiated from said end-user communicating device for determining the point of origin of said call;

means for retrieving from said database network routing information associated with said point of origin, said network routing information including an access code for said communications carrier, and exchange numbers of an intraLATA toll calling area serving said originating point; and means for transmitting said network routing information for storage in a memory of said end-user communicating device to allow said access code to be prepended to subsequently dialed digits entered from said end-user communicating device to initiate intraLATA toll calls.

8. The system of claim 7 wherein said end-user communicating device includes a processor which determines whether an intraLATA call is a toll call.

9. A method of using an end-user communicating device for intraLATA toll calls, said method comprising the steps of:

initiating a first telephone call in order to access a database in a user-selected communications carrier network;

storing data retrieved from said database in a memory in said end-user communicating device, said data including a) a carrier access code that is used to establish intraLATA toll calls, and b) exchange numbers included in an intraLATA toll calling area associated with origination information obtained during said first telephone call;

in response to receiving a telephone number subsequently dialed by a user of said end-user communicating device initiating an intraLATA call, determining whether said dialed telephone number comprises one of said exchange numbers included in said intraLATA toll calling area; and in response to signals indicating that said intraLATA call is a toll call, prepending said carrier access code to said subsequently dialed telephone number.

10. The method of claim 9 wherein said method further comprises the steps of:

identifying in said user-selected communications carrier network an originating telephone number for said first telephone call;

retrieving from said database exchange numbers included in an intraLATA toll calling area associated with said originating telephone number; and downloading said retrieved exchange numbers into said memory of said end-user communicating device.

11. The method of claim 9 wherein said method further comprises the steps of:

prompting a caller initiating said first telephone call to solicit a particular telephone number at which said end-user communicating device is to be used;

retrieving from said database exchange numbers included in an intraLATA toll calling area associated with said particular telephone number; and downloading said retrieved exchange numbers into said memory of said end-user communicating device.

12. The method of claim 9 wherein, whenever said stored data has been corrupted, said method further comprises the steps of:

retrieving the telephone number of said user-selected communications carrier network from a storage area within said end-user communicating device; and dialing the telephone number of said user-selected communications carrier network to refresh said memory of said end-user communicating device.

13. The method of claim 9 wherein said first telephone call is a toll-free telephone call.

14. The method of claim 9 wherein said method further comprises the step of:

downloading said data to said end-user communicating device in response to said first telephone call.

15. A method of completing an intraLATA phone call initiated from an originating point, said method comprising the steps of:

dialing a predetermined number of digits using an end-user communicating device to initiate an intraLATA phone call;

determining within said end-user communicating device whether said intraLATA call is a toll call by comparing an exchange number formed by the first three dialed digits to pre-stored exchange numbers of an intraLATA toll calling area serving said originating point, said pre-stored exchange numbers having been previously downloaded along with a carrier access code, in a storage device of said end-user communicating device by a database system of a communications carrier in response to an initialization call initiated from said end-user communicating device at said originating point;

in response to signals indicating that said intraLATA call is a toll call, prepending said carrier access code to said dialed digits; and routing said access code and said dialed digits to a central office switch to complete said intraLATA call over a network of said communications carrier.

* * * * *